US006285799B1

(12) United States Patent
Dance et al.

(10) Patent No.: US 6,285,799 B1
(45) Date of Patent: Sep. 4, 2001

(54) APPARATUS AND METHOD FOR MEASURING A TWO-DIMENSIONAL POINT SPREAD FUNCTION OF A DIGITAL IMAGE ACQUISITION SYSTEM

(75) Inventors: Christopher R. Dance, Cambridge; Mauritius Seeger, Royston, both of (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/211,649

(22) Filed: Dec. 15, 1998

(51) Int. Cl.$^7$ ........................................................ G06K 9/40
(52) U.S. Cl. ............................................ 382/261; 382/260
(58) Field of Search ........................... 382/254, 260–266, 382/270–272

(56) References Cited

U.S. PATENT DOCUMENTS

| 3,743,727 | | 7/1973 | Weiser | 356/124 |
| 5,168,532 | * | 12/1992 | Seppi et al. | 382/50 |
| 5,303,023 | | 4/1994 | Portney et al. | 356/124.5 |
| 5,453,844 | * | 9/1995 | George et al. | 358/426 |
| 5,561,611 | * | 10/1996 | Avinash | 364/553 |
| 5,600,574 | | 2/1997 | Reitan | 364/552 |
| 5,621,519 | | 4/1997 | Frost et al. | 356/124.5 |
| 5,627,918 | * | 5/1997 | Carasso | 382/254 |
| 5,696,850 | | 12/1997 | Parulski et al. | 382/261 |
| 5,818,572 | | 10/1998 | Pappas et al. | 356/124.5 |

OTHER PUBLICATIONS

Hong, Q.H. et al. "Measuring the MTF for Focal Plane Arrays Using Random Noise Targets," Meas. Sci. Technol. vol. 7, 1996, pp. 1087–1091.
International Organization for Standardization Technical Committee 42–Photography. "Photography–Electronic Still Cameras–Resolution Measurements," International Organization for Standardization, Nov. 18, 1997.
Reichenbach, Stephen et al. "Characterizing Digital Image Acquisition Devices," Optical Engineering, vol. 30, No. 2, Feb. 1991, pp. 170–177.

* cited by examiner

*Primary Examiner*—Thomas D. Lee
*Assistant Examiner*—Stephen Brinich

(57) ABSTRACT

A point spread function (PSF) of a digital camera is measured in two-dimensions. To measure the PSF in two dimensions a grid of dots is defined on a calibration chart. The calibration chart is recorded with the digital camera to define a calibration image. The grid of dots recorded in the calibration image has dots with three different sizes. The two of the largest sizes of dots are used to provide a coarse-to-fine registration of the calibration image with the calibration chart. Once aligned, the locations of the smallest of the dots in the calibration image are used to define a composite dot image. The level of noise in the composite dot image is minimized by averaging over many small dots in the grid of dots. In addition, the composite dot image is super-resolved in order to minimize the effects of aliasing. Once the PSF is measured for the digital camera, the PSF can be used in a restoration filter to remove blur in images recorded with the digital camera.

20 Claims, 13 Drawing Sheets

APPARATUS AND METHOD FOR MEASURING A TWO-DIMENSIONAL POINT SPREAD FUNCTION OF A DIGITAL IMAGE ACQUISITION SYSTEM

BACKGROUND OF THE INVENTION

1. Field of the Invention

The present invention relates generally to digital image processing, and more particularly, to a technique for measuring a two-dimensional point spread function (PSF) of a digital image acquisition system.

2. Description of Related Art

An important characteristic of a digital image acquisition system, such as a digital camera, is its ability to resolve the detail of an original scene in a recorded image. Factors that affect the resolution at which a digital image acquisition system can record an original scene include the quality of the system's optics, the resolution or response of the system's CCD sensor array, and the effectiveness of the system's integrated image processing components directed at correcting image defects. There exists a number of different resolution metrics for measuring the ability of a digital image acquisition system to preserve the sharpness of an original scene in a recorded image.

One resolution metric that measures the amount of blur introduced into a recorded image is known as a camera's point spread function (PSF). By definition, the PSF of a camera provides a metric for determining the degree to which a perfect point in an original scene is blurred in a recorded image. In other words, the PSF is the image of a point source. More specifically, the PSF is the two-dimensional impulse response of a digital image acquisition system. Generally, digital image acquisition systems gradually lose the ability to contrast detail as the detail in an original scene becomes finer and finer. Thus, digital image acquisition systems tend to have a PSF that is significantly larger than an ideal dot because of the system's finite optical aperture and the spacing, shape and size of the optical sensor array elements. Many digital image acquisition systems are well approximated by linear systems. Consequently, blurred images recorded by them can be considered the superposition of the PSF of all points in the imaged object. As such, blurring is essentially the convolution of an image with a PSF.

The spatial frequency response of a digital image acquisition system is the two-dimensional Fourier transform of the PSF, which is defined as the optical transfer function (OTF). The modulus of the OTF is the modulation transfer function (MTF). In other words, the MTF is the magnitude of the OTF. The MTF provides a continuous measure of the contrast response of a digital image acquisition system to a range of spatial frequencies. If a digital image acquisition system were able to record an image that is an exact replica of an original scene, the contrast of the recorded image would be exactly the same as the contrast of the original scene at all frequencies. In reality, however, digital image acquisition systems are unable to maintain the contrast at higher frequencies, thereby recording a blurred image of an original scene.

The recorded blurred image of an original scene can be corrected with a restoration filter, which can be designed using knowledge of a PSF. The restoration filter sharpens recorded images of an original scene by removing the blurring introduced by the digital image acquisition system. By way of example, a very simple restoration filter that removes image blur, and thereby sharpens a recorded image, is an inverse filter that divides the two-dimensional Fourier transform of the recorded image by the optical transfer function of the digital image acquisition system. In effect, accurately measuring the PSF for a digital image acquisition system provides both a metric for defining the system's ability to preserve detail as well as a transfer function for correcting the blurring introduced by imperfect optical components of the system.

There exist two basic classes of methods for estimating a digital image acquisition system's PSF: calibration methods and blind methods. Generally, calibration methods require the user of a camera scanning system to acquire an image of a special page, whereas blind methods can be used with no user intervention. More specifically, calibration methods require that an image of a known scene (i.e., a test chart) be recorded. The special properties of the known scene enable more accurate estimation of the PSF. In contrast, blind methods make very simple assumptions about the blur and an original scene. Although blind methods enable the estimation of a PSF from arbitrary images, blind methods generally tend to produce less accurate results and run slower than calibration methods.

Two commonly used calibration methods for estimating a PSF are the knife-edge method and the random noise pattern methods. The knife-edge method is disclosed by Reichenbach et al., in "Characterizing Digital Image Acquisition Devices," *Optical Engineering* Vol. 30, No. 2., pp. 170–177, Feb. 1991 (also disclosed in ISO Standard 12233—"Photography—Electronic Still Picture Cameras—Resolution Measurements," 1997). Generally, the knife-edge method estimates a PSF from a recorded image of a slanted straight-edged discontinuity in image intensity. The distance from the edge is used to super-resolve the image to estimate the super-resolved edge-spread function. Under the assumption of circular symmetry, the derivative of the edge-spread function provides an estimate of the PSF.

The random noise method, which is disclosed by Hong et al., in "Measuring The MTF For Focal-Plane Arrays Using Random Noise Targets," Measurement Science and Technology Vol. 7, No. 7, pp.1087–1091, 1996, uses an image of white noise (i.e., noise with equal power at each spatial frequency) to measure MTF. The noise is usually printed as a random black and white dot pattern in order to maximize signal-to-noise ratio and for ease of printing. The random noise method relies on the observation that the power spectrum of blurred white noise is the same as the power spectrum of the blur, in the absence of further additive noise. This method may be used to estimate the aliased point spread function in two-dimensions. Another alternative is to super-resolve a one-dimensional estimate of the PSF by expanding a one-dimensional white noise test pattern into a series of lines. If the lines are slanted, the same super-resolution technique as used in the knife-edge method may be applied.

Neither the knife-edge method nor the random noise methods are very accurate measures of the two-dimensional PSF. The knife-edge method estimates the two-dimensional PSF by assuming that a one-dimensional point spread function is symmetric. However, it is not always accurate to assume that a PSF is symmetric for some of the following reasons. First, camera optics may give rise to asymmetric effects such as coma. Second, CCD or CMOS elements in digital cameras tend not to have symmetric optical sensitivities. In addition, although the random noise method estimates a two-dimensional PSF, it is a limited estimate of a two-dimensional PSF because it only estimates the magnitude of the PSF, and not its sign or phase.

Accordingly, it would be advantageous to provide an improved method for measuring a two-dimensional PSF. Furthermore, it would be advantageous if the improved method for measuring a two-dimensional PSF did not assume that image acquisition systems have a PSF with symmetric properties. One motivation for developing a more accurate method for measuring a digital image acquisition system's PSF is that digital cameras are increasingly used as an interface to display and record images of documents. Unlike document scanning devices such as a flatbed, a hand-held, or a sheet-fed scanner, digital cameras operate under less controlled conditions. That is, the images recorded with digital cameras have lower resolutions and therefore tend to be blurrier than images recorded with document scanners. Blur introduced into recorded images by imperfect electro-optical recording systems can be corrected by accurately estimating the PSF of the recording systems.

SUMMARY OF THE INVENTION

In accordance with the invention, there is provided a method and apparatus therefor, for measuring the two-dimensional point spread function (PSF) of a digital image acquisition system. Initially, an image of a calibration chart is recorded with the digital image acquisition system. The recorded image of the calibration chart, which has a set of entities arranged in a grid-like pattern, is defined to be a calibration image. After recording the calibration image, locations of the entities in the set of entities are identified in the calibration image. Finally a measure of the PSF of the digital image acquisition system in two-dimensions is provided by deriving a composite image of the entities forming the grid-like pattern using their pixel values at their identified locations in the calibration image.

In accordance with one aspect of the invention, an image of a calibration chart is defined to have a set of entities that form a grid of dots. The grid of dots forming the calibration chart has three sets of different sized dots. The largest set of dots, or corner dots, is used to provide initial registration of the calibration chart with a recorded image of the calibration chart. The second largest set of dots on the calibration chart is used to measure image distortions in the recorded image. Finally, the smallest set of dots, or small dots, are used for measuring the point spread function of the image acquisition system.

In accordance with another aspect of the invention, a super-resolution factor is selected for increasing the resolution of the composite dot image relative to the resolution of the calibration image. In effect, the resolution of the calibration image is increased by the super-resolution factor to that of the composite dot image. Advantageously, the super-resolution factor is used to minimize the effects of aliasing when measuring the point spread function of the image acquisition system.

In accordance with yet another aspect of the invention, the corner dots and registration dots provide coarse-to-fine registration of the calibration chart with a calibration image. The corner dots and the registration dots are used to locate positions of the small dots in the calibration image. Initially, centroids of the corner dots are computed. Using the computed centroids, a transformation is computed for registering the calibration chart with the calibration image. Subsequently, the centroid of each of the registration dots is computed using the transformation to develop a map of image distortions. Image distortions in the calibration image are smoothed by averaging the computed distortion vectors over a neighborhood of distortion vectors.

The positions of each of the small dot in the calibration image are determined with the smoothed image distortion vectors, the positions of the small dots in the calibration chart, and the transformation computed for registering the calibration image with the calibration chart. To remove the effects of lighting variations in the calibration image, the area around the position of each small dot is normalized. To construct the composite dot image, the gray value of each pixel surrounding the position of the small dot is added to the corresponding pixel (or bin) in the composite dot image. Finally, the gray values of each of the pixels in the composite dot image are reversed to obtain a super-resolved two-dimensional PSF.

BRIEF DESCRIPTION OF THE DRAWINGS

These and other aspects of the invention will become apparent from the following description read in conjunction with the accompanying drawings wherein the same reference numerals have been applied to like parts and in which.

DETAILED DESCRIPTION

A. Overview

Figure 1:
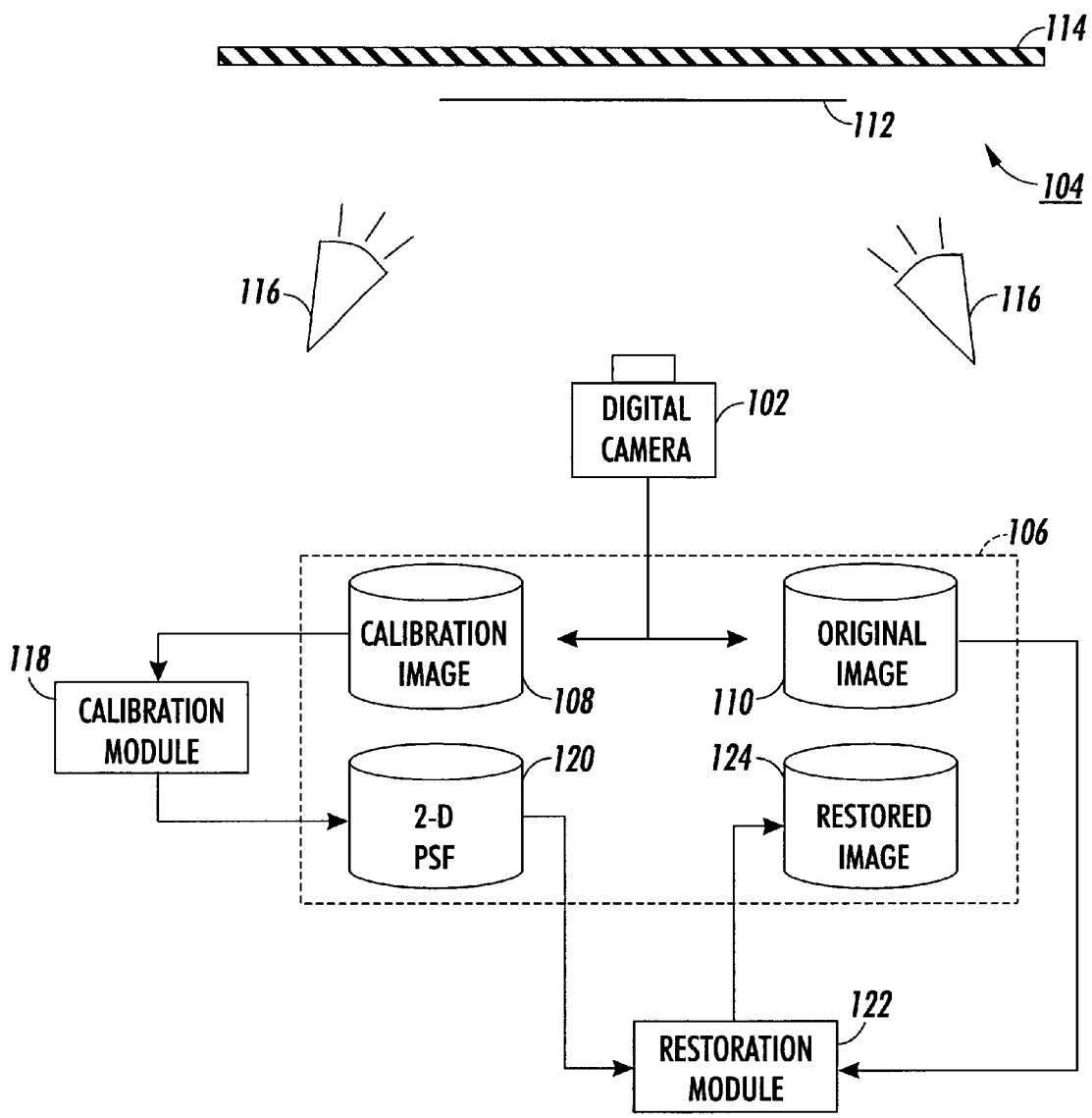
FIG. 1 illustrates an arrangement for measuring a two-dimensional point spread function (PSF) of a digital image acquisition system.

FIG. 1 illustrates an arrangement for measuring a two-dimensional point spread function (PSF) of a digital image acquisition system in accordance with the present invention. In one embodiment, the digital image acquisition system is a digital camera 102. In alternate embodiments, the digital image acquisition system consists of either a document scanner or a video camera coupled to a frame grabber.

Forming part of the digital camera 102 is a lens for directing image light from an original scene through an aperture controller upon electro-optical recording sensor. The sensor is any device, such as a charge coupled device (CCD), that converts radiant energy of a particular wavelength or range of wavelengths into an electrical signal. The electrical signals output from the sensor are converted from analog signals to digital image signals. The converted digital image signals, which represents an original scene, are stored in a memory 106 as either a calibration image 108 or an original image 110.

An example of an original scene 104 is illustrated in FIG. 1. The original scene 104 includes a calibration chart 112 and a background scene 114. The calibration image 108 corresponds to an image of the calibration chart 112 recorded with the digital camera 102. As shown in FIG. 1, the digital camera 102 captures image signals of a reflection of the calibration chart 112 that is illuminated by lamps 116. These captured image signals, which are stored in the memory 106, define the calibration image 108. When the digital camera 102 records image signals of an original scene without the calibration chart 112, the recorded image signals represent an image scene that defines an original image 110. Using the recorded calibration image 108, a calibration module 118 is used to estimate a two-dimensional (2-D) PSF of the digital camera 102, the details of which are set forth below. The output of the calibration module 118 is stored in memory 106 as a 2-D PSF 120.

Once the 2-D PSF 120 is estimated for the digital camera 102, the estimate can be used for number of different purposes. In one embodiment, the 2-D PSF 120 is used as a metric for specifying the ability of the digital camera to record an original scene without blur. Alternatively, the 2-D PSF 120 and the original image 110 are input to a restoration module 122. The output of the restoration module 122 is a restored image 124. The restored image 124 is a deblurred version of the original image 110. It will be appreciated by those skilled in the art that the system components, which include the memory 106, the calibration module 118, and the restoration module 122, can be either partly or completely integrated with other elements forming the digital camera 102. It will be further appreciated by those skilled in the art that one or more of these system components can form part of any digital image processing system that operates in conjunction with or independent from any digital image acquisition system.

B. Overview of Method for Measuring A 2-D Point Spread Function

In accordance with one aspect of the invention, an apparatus and method is described for measuring a 2-D of a digital image acquisition system. Ideally, a 2-D PSF could be measured directly by exploiting its definition as the response of an imaging system to a single infinitesimal point source. In practice, however, noise and aliasing prevent measuring a 2-D PSF directly. The present invention provides a method for measuring a 2-D PSF that advantageously avoids introducing noise by averaging over a configuration of small repeating entities recorded in the calibration image 108. In one embodiment, the entities, which define the configuration of small entities, are defined using elements that represent or approximate dots. In alternate embodiments, other elements such as line segments are used to define the configuration of small entities. In addition, the present invention's method for measuring a 2-D PSF avoids aliasing by super-resolving the configuration of small dots recorded in the calibration image 108.

Figure 2:
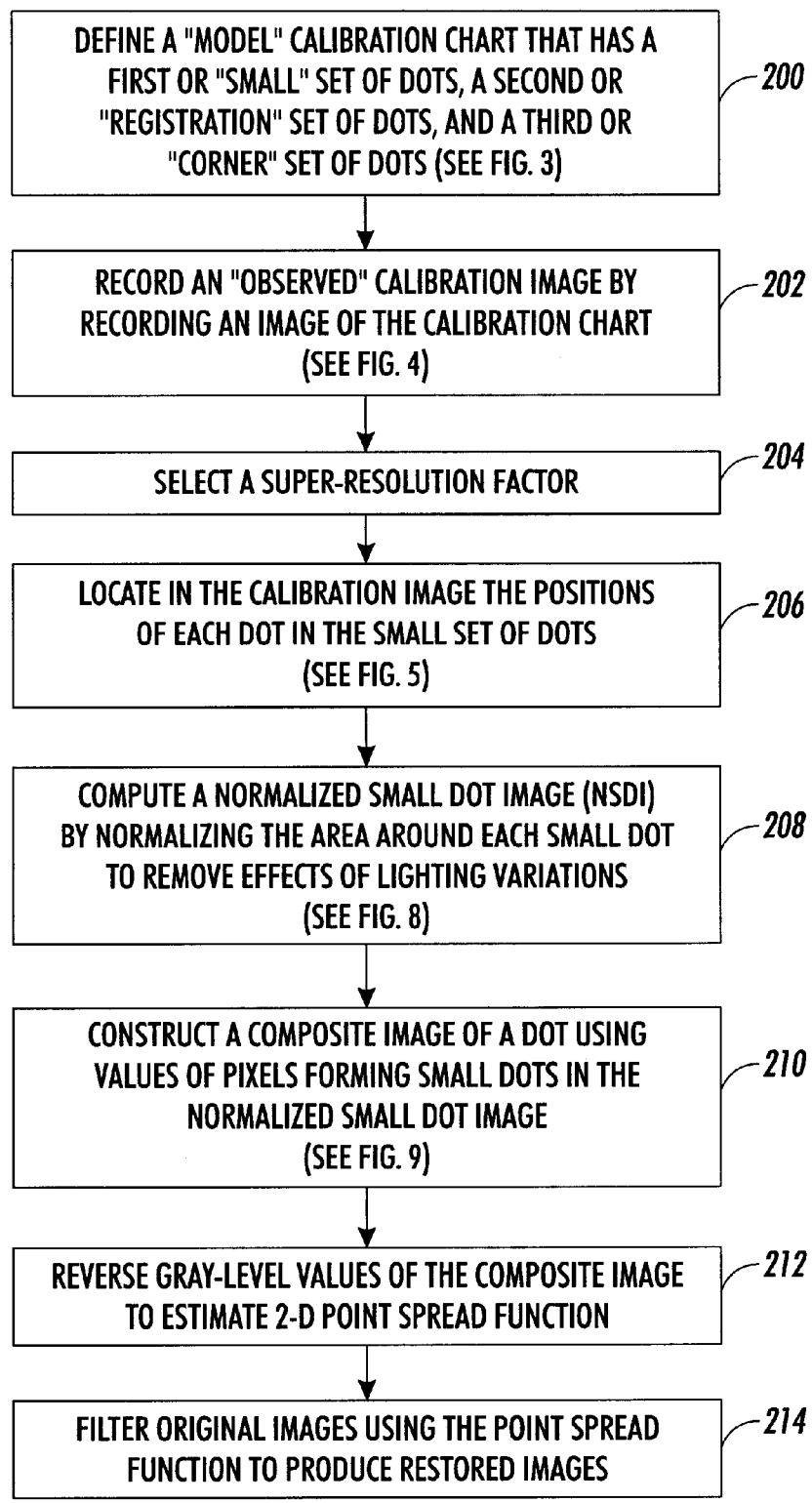
FIG. 2 is a flow diagram that sets forth the steps for measuring a two-dimensional PSF of a digital image acquisition system.
Figure 3A:
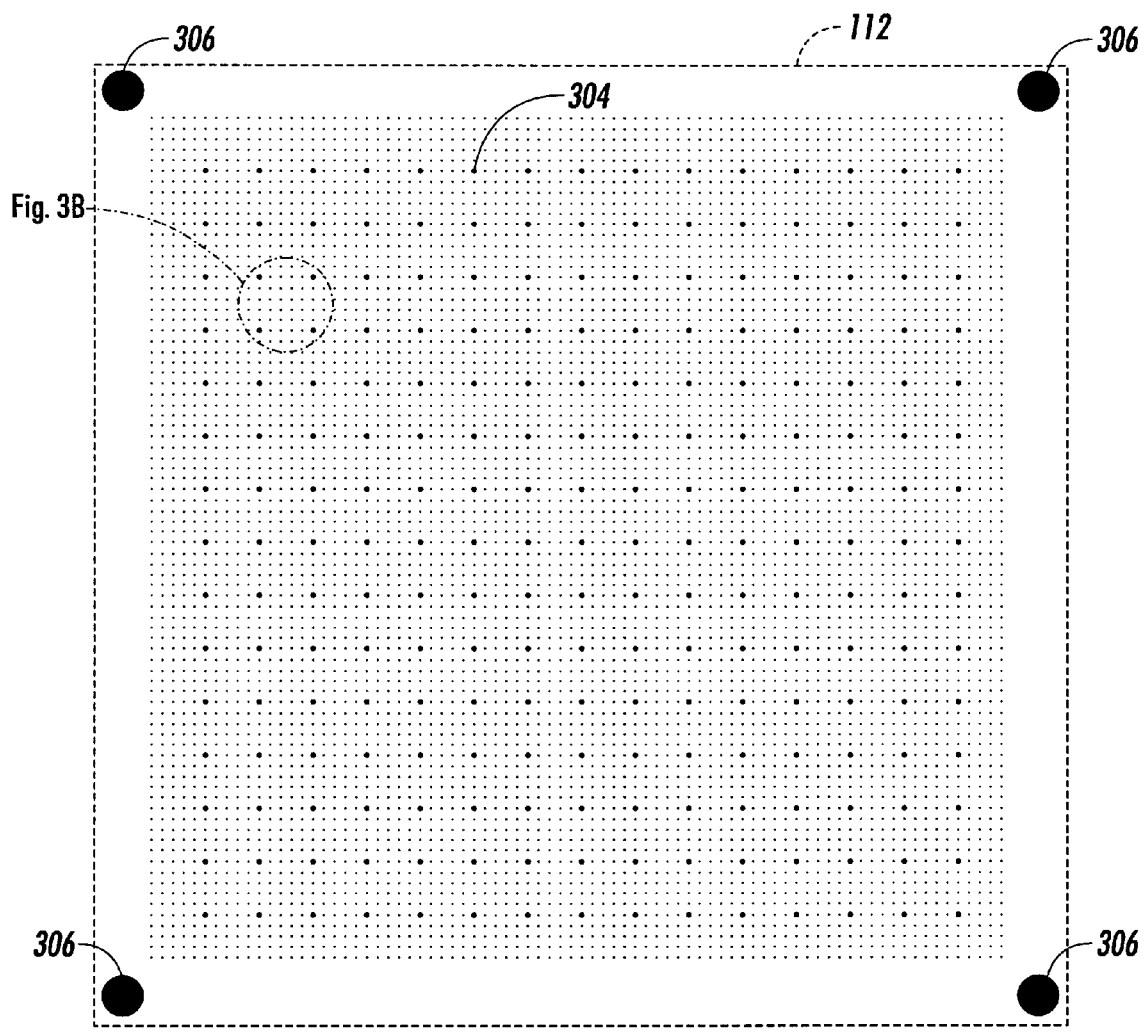
FIG. 3A illustrates an example of a calibration chart that is used to measure the two-dimensional PSF of the digital image acquisition system.
Figure 3B:
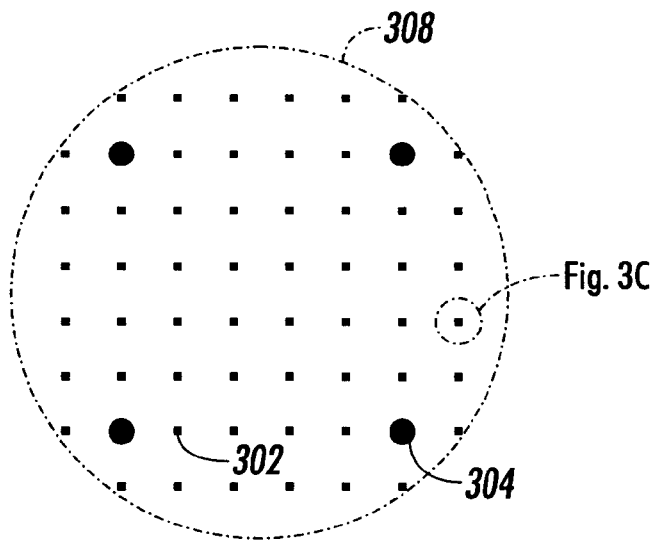
FIG. 3B illustrates a blow up of a portion of FIG. 3A.
Figure 3C:
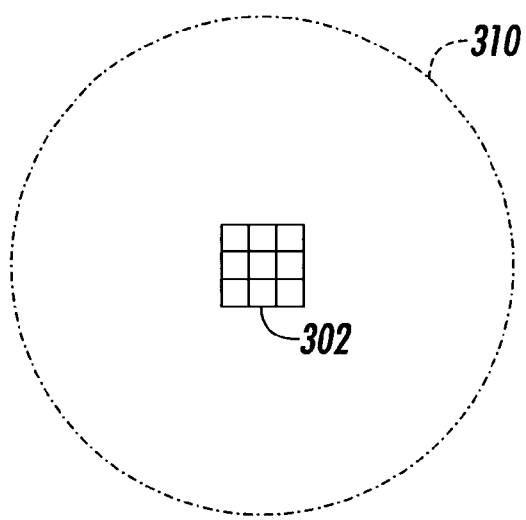
FIG. 3C illustrates a blow up of a portion of FIG. 3B.

FIG. 2 is a flow diagram that sets forth in a generalized manner the steps for measuring the 2-D PSF 120 of the digital camera 102. Initially, at step 200 the "model" calibration chart 112 (or test chart) is defined. An example of the calibration chart 112 is shown in FIG. 3 and discussed in detail below in Section C. As shown in FIGS. 3A–3C, the calibration chart 112 includes three sets of different sized dots: small dots 302, registration dots 304, and corner dots 306. The three sets of different sized dots consist of entities that have shapes that approximate the appearance of a dot.

Digital image acquisition systems, such as the digital camera 102 are designed to undersample an original scene. Undersampling causes aliasing, which is defined as the folding of spatial-frequency components above the Nyquist frequency into frequencies below the Nyquist frequency. High frequency components must be distinguished from their aliased counterparts to accurately estimate a system's PSF. One manner of accomplishing this is by super-resolving a system's PSF. Super-resolving image data involves recovering higher spatial frequencies than the Nyquist frequency of the original image. The present invention advantageously super-resolves the 2-D PSF by localizing to sub-pixel accuracy the known configuration of dots recorded in the calibration image. The degree that an image is super-resolved is defined herein as the "super-resolution factor."

As shown in FIG. 2, after defining the calibration chart 112 at step 200, an image of the calibration chart 112 is recorded with the digital camera 102 at step 202. The recorded image, which is defined herein as the "observed" calibration image 108, is stored in memory 106. Subsequently at step 204, an operator of the digital camera 102 selects a super-resolution factor at which to super-resolve the calibration image 108. It will be appreciated that in an alternate embodiment, the digital camera 102 can be configured to automatically select the super-resolution factor without user intervention by accessing a pre-selected super-resolution factor. The value of the super-resolution factor selected at step 204 can be any value that is greater than, less than, or equal to one. A super-resolution factor that is less than one reduces the resolution of an image, whereas a super-resolution factor that is equal to one does not change the resolution of an image, and a super-resolution factor that is greater than one increases the resolution of an image.

Once the calibration image 108 is acquired at step 202 and a super-resolution factor is selected at step 204, the corner dots 306 and the registration dots 304 are used to obtain coarse and fine alignment, respectively, of the calibration image 108 with the calibration chart 112, at step 206. By knowing how the calibration image and calibration chart should be aligned, locations of the small set of dots 302 are accurately located in the calibration image 108. Using the positions of the small dots 302 in the calibration image 108, a normalized small dot image (NSDI) is computed at step 208 by normalizing the area around each small dot to remove the effects of lighting variations. Further details of step 208 are set forth below in Section F.

Using the pixels in the normalized small dot image computed at step 208, a composite image of a dot (i.e., a composite dot image) is constructed at step 210. Details of this construction are set forth below in Section G. At step 212, the gray level values of the composite dot image constructed at step 210 are reversed to define the 2-D PSF 120. The reversed image is formed by subtracting each gray value in the super-resolved dot image from the maximum gray value of that image. Finally, at step 214, the original image 110 is filtered from blur using the 2-D PSF 120 generated at step 212. The details of step 214 are discussed in greater detail below in Section H.

C. The Calibration Chart

FIGS. 3A–3C illustrate an example of the calibration chart 112. Generally, the calibration chart 112 is a grid of dots which has three sets of dots. Each set of dots is distinguished from the next by its size, with the first set having the smallest dot diameter and the third set having the largest dot diameter. The dots in each set of dots are of equivalent size. The first set or "small" set of dots are identified in the Figures using reference number 302. The second or "registration" set of dots are identified in the Figures using reference number 304. Finally, the third or "corner" set of dots are identified in the Figures using reference number 306.

The calibration chart 112 is generated, in one embodiment, by printing on a 300 dpi (dot per inch) printer a binary bitmap having the dimensions of 1800×1800 pixels. The third set of "corner" dots 306 are positioned in the corners of the calibration chart 112. The corner dots 306, which are the largest of the dots, are centered at the corners of a square. Each of the corner dots 306 is a disk that has a diameter of 81 pixels in the binary image from which the calibration chart 112 is printed. As described in more detail below, the corner dots 306 are used to provide a gross initial registration between the calibration chart 112 and the calibration image 108.

The second set of registration dots 304 are the second largest set of dots positioned on the calibration chart 112. Some of the registration dots 304 are shown in FIG. 3B in the blow up 308 of a portion of the calibration chart 112 shown in FIG. 3A. Each of the registration dots 304 is a disk that has a diameter of 9 pixels in the binary bitmap image from which the calibration chart 112 is printed. The present invention uses the calculated centroids of the registration dots 304 to measure local image distortion in the calibration image 108 to provide finer registration between the calibration chart 112 and the calibration image 108.

The third set of "small" dots 302 are illustrated in detail in FIG. 3C in the blow up 310 which is an expanded section of a portion of blow up 308 shown in FIG. 3B. The dimensions and separation of the small dots 302 are selected so that they are spread far enough apart so that the PSFs for each dot do not interfere with each other. In addition, the small dots 302 are defined so that they are large as possible to maximize the signal-to-noise ratio, and yet small enough that their dimension causes little bias in the measurements of the PSF. In the embodiment illustrated in FIG. 3C, each small dot 302 is defined to be a square with sides that are 3 pixels in length. Each small dot 302 is separated from other small dots 302 by 38 pixels. Experimentally it has been found that the registration chart 112 illustrated in FIGS. 3A–3C provides good results for a digital camera that acquires images with a resolution of 640×480 pixels.

Those skilled in the art will appreciate that there exist many different ways in which the calibration chart 112 can be defined, and that FIG. 3A illustrates only one example of a calibration chart that can be used to carry out the present invention. For example, in one alternate embodiment a hexagonal arrangement of small dots 302 can be used in place of the square dot configuration illustrated in blow up 310. The hexagonal arrangement may have some advantages over the computational simplicity of a square dot since a 2-D PSF is assumed to have a circular appearance.

D. The Calibration Image

Figure 4:
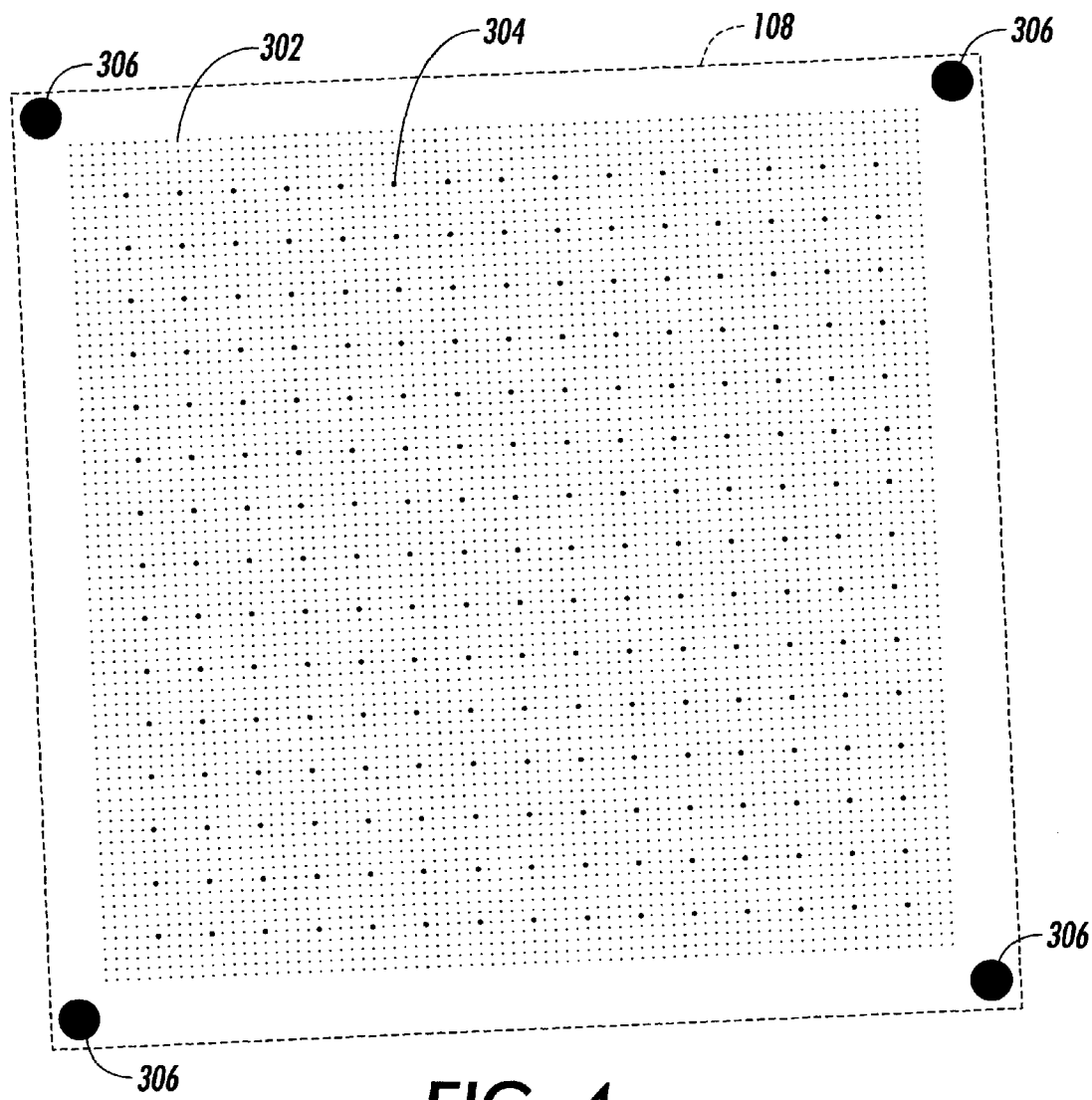
FIG. 4 illustrates an example of a calibration image (i.e., a recorded image of the calibration chart shown in FIG. 3A)

FIG. 4 illustrates an example of a calibration image 108 recorded at step 202 set forth in FIG. 2. The example calibration image 108 shown in FIG. 4 has a gray background color because it was recorded at low illumination. For example, many digital cameras used for video can only record an image of an 8.5"×11" page at 56 dpi (dots per inch). Also, It should be noted that the calibration image 108 is not aligned rotationally or translationally with the calibration chart 112. In order to compute the PSF 120 for the digital camera 102, the calibration image 108 must be accurately aligned with the calibration chart 112. The alignment is accomplished at step 206, which is shown generally in FIG. 2 and set forth in greater detail in FIGS. 5, 6, and 7. Accurate alignment means that the positions of the small dots 302 can be predicted based on the definition of the "model" calibration chart 112.

E. Locating the Small Dots in the Calibration Image

Figure 5:
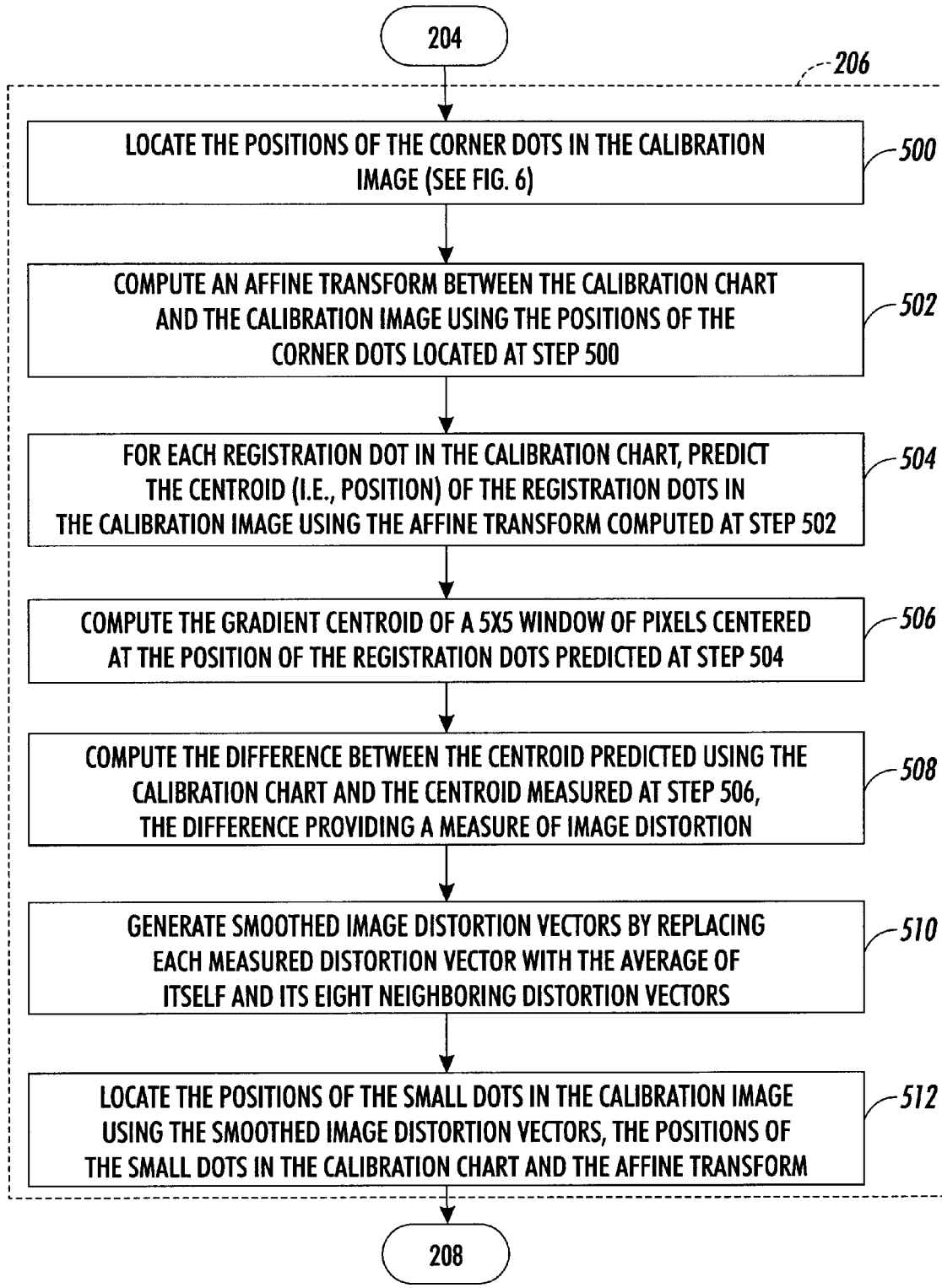
FIG. 5 is a flow diagram that sets forth in detail the step (i.e., step 206 shown in FIG. 2) for locating the small dots in the calibration image shown in FIG. 4.
Figure 6:
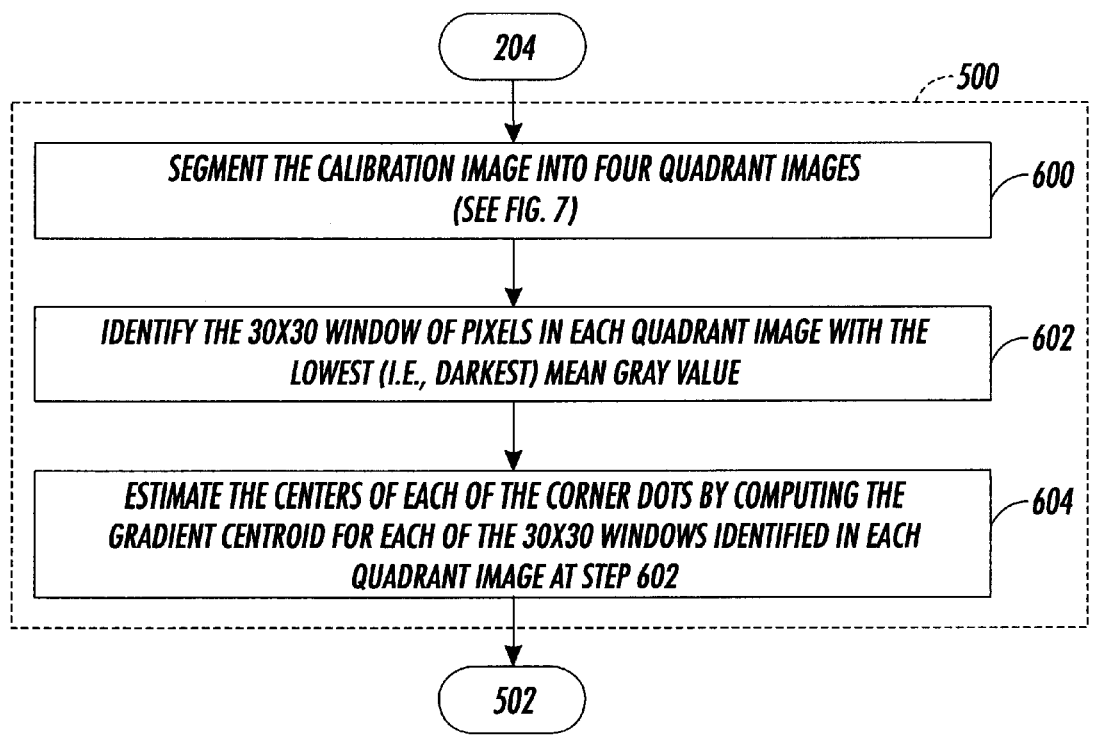
FIG. 6 is a flow diagram that sets forth the step for locating positions of the corner dots in the calibration image.

Once a calibration image is acquired and a super-resolution factor selected, coarse-to-fine alignment of the calibration image with the calibration chart is achieved using the corner dots 306 and the registration dots 304. FIG. 5 is a flow diagram that sets forth in detail the step 206 (shown in FIG. 2) for locating the small dots 302 in the calibration image 108. At step 500, the corner dots 306 are located in the calibration image 108. The step 500 is set forth in greater detail in FIGS. 6 and 7. Initially, at step 600 set forth in FIG. 6, the calibration image 108 is segmented into four quadrants.

Figure 7:
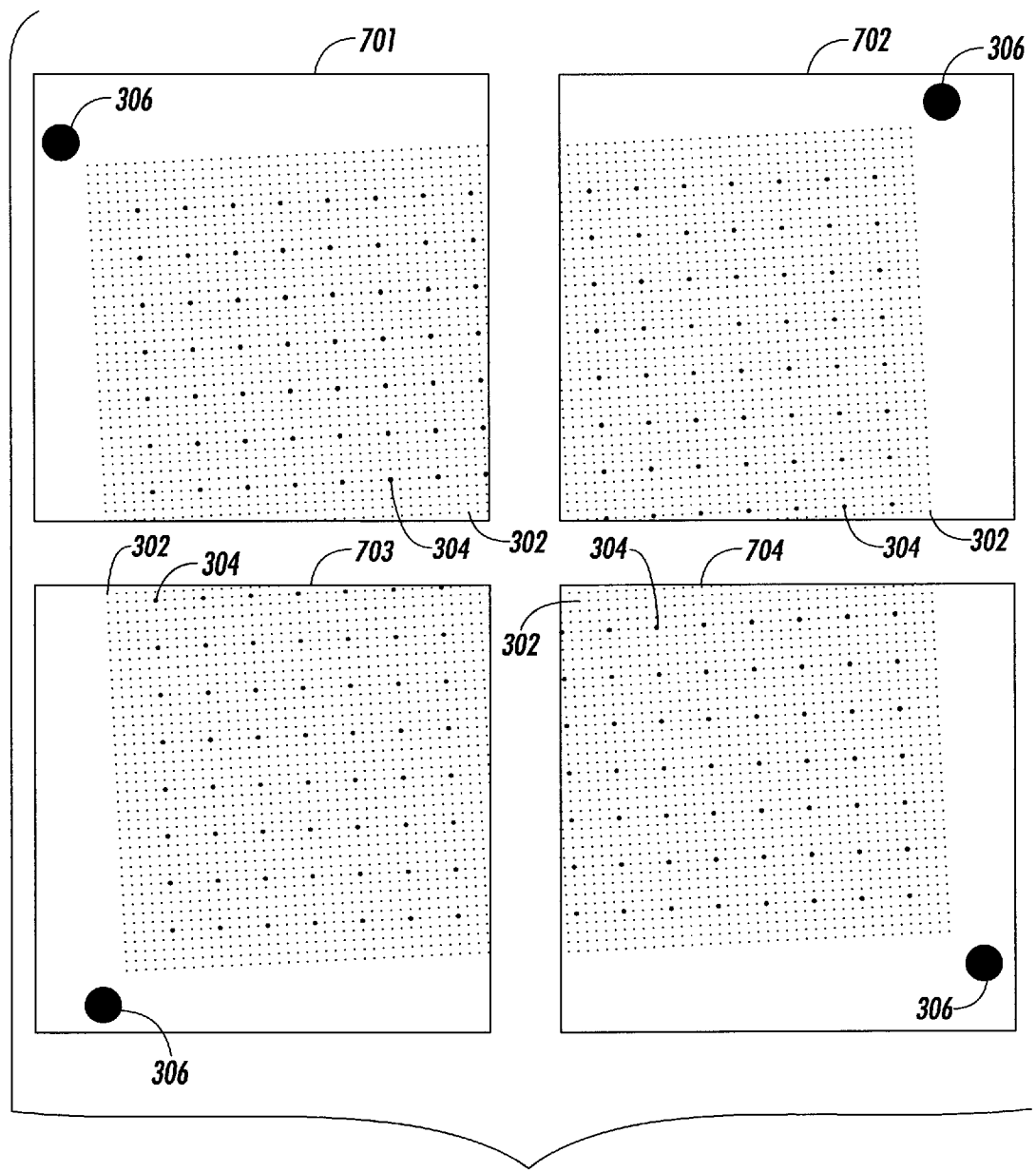
FIG. 7 illustrates four segmented quadrants of the calibration image illustrated in FIG. 4.

FIG. 7 illustrates an example a calibration image 108 that has been segmented into four quadrant images 701, 702, 703, and 704. At step 602, each of the four quadrant images 701–704 are examined to identify the position in each quadrant that has the lowest (i.e., darkest) mean gray value. The lowest mean gray value in each of the four quadrants is obtained by computing a moving average over a 30×30 window of pixels. Finally at step 604, the center positions of each of the corner dots 306 are estimated by computing the gradient centroid for each of the 30×30 windows identified at step 602.

Each of the gradient centroids at step 604 is computed by performing the following operations. Given an image (e.g., one of the quadrant images 701–704) with gray values I(x,y) and a window W, containing m pixels (e.g., m =900), the gradient centroid ($x_c$, $y_c$) is taken to be the position weighted absolute gradient average as defined by the following equations:

$$x_c = \sum_{(x,y) \in W} xg(x,y) \Big/ \sum_{(x,y) \in W} g(x,y),$$

$$y_c = \sum_{(x,y) \in W} yg(x,y) \Big/ \sum_{(x,y) \in W} g(x,y),$$

where the gradient g(x,y) is given by the equation:

g(x,y)=|I(x,y)−I(x−1,y)|+|I(x,y)−I(x,y−1)|.

Although such centroids are biased because of the asymmetry of the gradient g(x,y), the bias is the same for all centroids evaluated. Since only relative centroid positions are used by the overall procedure, this inaccuracy has no detrimental effects in computing the gradient centroid of an n×n window of pixels in an image.

Referring again to FIG. 5, an affine transform between the calibration chart 112 and the calibration image 108 is computed at step 502 using the positions of the centers of the corner dots 306 located at step 500. It will be appreciated by those skilled in the art that more general transformations, such as perspective transformations, can be used in place of an affine transform to carry out the present invention. To compute the affine transform of this embodiment, let n pairs (e.g., n=4 for each of the four corner dots computed at step 500) of corresponding points (x,y) be represented as two-dimensional vectors $(w_1, \ldots, w_n)$ and $\{z_1, \ldots, z_n\}$ to which it is desired to fit an affine transform so that $$z_k = Aw_k + t$$

where A is a two-by-two matrix, t is a two-dimensional vector, $w_k$ is a point (x,y) in the calibration image 108, and $z_k$ is a point (x,y) on the model calibration chart 112. Since these points are noisy, the least squares solution is computed by minimizing J(A,t) with respect to A and t as follows:

$$J(A, t) = \sum_{k=1}^{n} (Aw_k + t - z_k)^2$$

To optimize the least squares solution, J(A,t) is differentiated with respect to t and A as follows:
Differentiating first with respect to $$t \left(\text{i.e.,}\ \frac{\partial J}{\partial t} = 0\right)$$

results in the equation:

$$t = \bar{z} - A\bar{w}, \text{ where } \bar{z} = \frac{1}{n}\sum_{k=1}^{n} z_k, \text{ and } \bar{w} = \frac{1}{n}\sum_{k=1}^{n} w_k.$$

Subsequently, differentiating with respect to A $$\left(\text{i.e.,}\ \frac{\partial J}{\partial A} = \sum_{k=1}^{n}(w_k - \bar{w})(A(w_k - \bar{w}) - (z_k - \bar{z}))^T = 0\right)$$

results in the equation:

$$\left[\sum_{k=1}^{n}(w_k - \bar{w})(w_k - \bar{w})^T\right] A^T = \sum_{k=1}^{n}(w_k - \bar{w})(z_k - \bar{z})^T,$$

which is a linear equation that may be solved for A as follows:

$$A = (M^{-1}b)^T,$$

were $$M = \sum_{k=1}^{n}(w_k - \bar{w})(w_k - \bar{w})^T, \text{ and } b = \sum_{k=1}^{n}(w_k - \bar{w})(z_k - \bar{z})^T$$

The resulting solution of A may then be substituted back in the equation $(t=\bar{z}-A\bar{w})$ to find t.

At step 504 (shown in FIG. 5), the affine transform computed at step 502 is used to predict the positions of the registration dots 304 in the calibration image 108. This step corresponds with the coarse-to-fine strategy for aligning the calibration image with the calibration chart. At step 506, the gradient centroid of a 5×5 window of pixels centered at the position of the registration dots predicted at step 504, is computed. Details for computing the gradient centroid are set forth above in the discussion relating the estimation of the positions of each corner dot 306 at step 604.

At step 508, local image distortion is measured by computing the difference between the measured position of the registration dots 304 at step 506 (i.e., measured gradient centroids) and the position predicted using the affine transform computed at step 502. The difference between the measured centroids (or positions) and the predicted positions defines a distortion vector. The resulting output of step 508 is an image of distortion vectors for the registration dots 304.

Once distortion vectors for the registration dots are computed at step 508, the image of distortion vectors is smoothed at step 510 by replacing each measured distortion vector with the average of itself and its eight neighboring distortion vectors. Finally, the positions of the small dot 302 in the calibration image 108 are located using the smoothed image distortion vectors computed at step 510. Specifically, each small dot 302 is located using the following equation:

$$r_{s,CI} = Ar_{s,m} + t + d_s, \text{ where:}$$

$r_{s,CI}$=position (x,y) of a small dot in the calibration image,
A=affine transform matrix computed at step 502,
$r_{s,m}$=position (x,y) of a small dots in calibration chart,
t=affine transform vector computed at step 502, and
$d_s$=smoothed distortion vector of nearest registration dot.

F. Computing a Normalized Small Dot Image

Figure 8:
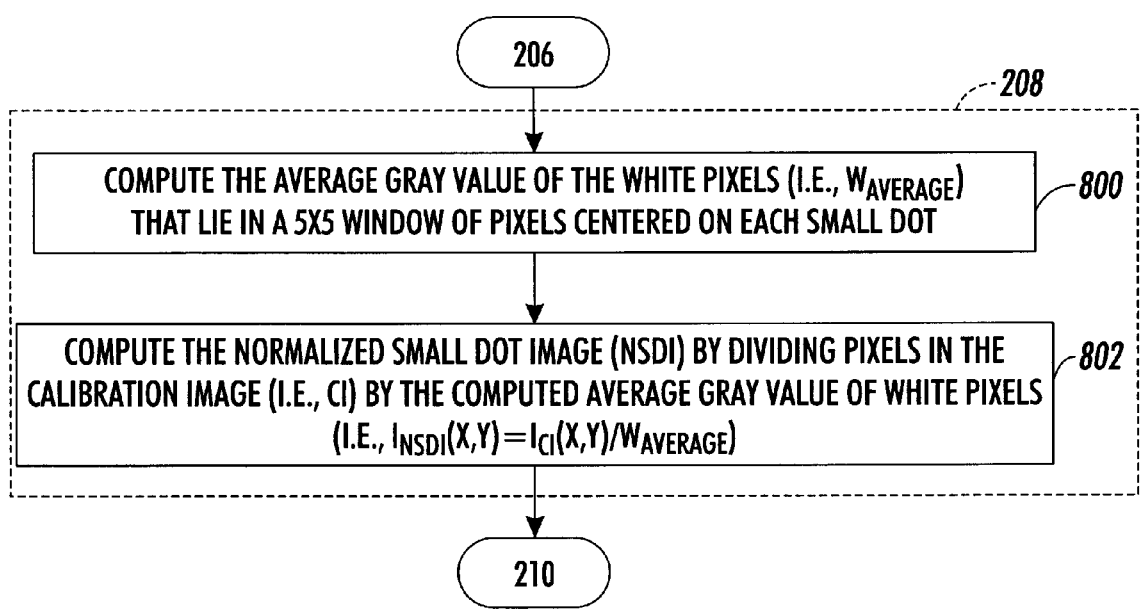
FIG. 8 is a flow diagram that sets forth the steps for computing a normalized small dot image to remove the effects of lighting variations in the calibration image.

After locating the position of each small dot 302 at step 206 in FIG. 2, a normalized small dot image (NSDI) is computed at step 208. The NSDI is computed by normalizing the area around each small dot 302 thereby removing effects of lighting variations. FIG. 8 is a flow diagram that sets forth one manner of computing the NSDI. At step 800, the average gray value of white pixels (i.e., $W_{average}$) that lie in a 5×5 window of pixels, which is centered on each small dot 302, is computed. White pixels are defined as pixels which correspond to the position of white areas in the calibration chart, taking into account the larger area occupied by the blurred small dots (i.e., black pixels) in the calibration image due to the PSF. Subsequently at step 802, the pixels forming the NSDI are computed by dividing pixels in the calibration image 108 by the average gray value of white pixels surrounding each small dot computed at step 800.

G. Constructing a Composite Image of a Dot

Once a normalized small dot image (NSDI) is computed at step 208 shown in FIG. 2, a composite image of a dot is constructed at step 210. The composite dot image is constructed with the gray values of pixels forming small dots in the NSDI. More specifically, FIG. 9 sets for a flow diagram with the steps for constructing a composite dot image. Initially at step 900, a relative pixel position (x,y) is computed for each small dot center (i.e., $(x_c, y_c)$) in the NSDI computed at step 206. The relative position of a pixel is the pixel's position relative to the small dot center (i.e., $(x-x_c)$, $(y-y_c)$). Subsequently at step 902, the pixel's relative position is multiplied by the super-resolution factor (i.e., α) selected at step 204 to define a bin coordinate (X,Y) (i.e., a super-resolution bin) in the composite dot image. At step 904, the gray value of each pixel forming each of the small dots in the NDSI is added to the bin corresponding to the computed bin coordinate (X,Y) at step 902.

The operations performed at steps 900–904 can be summarized as follows for bin coordinates (X,Y): X=round($\alpha$ (x-$x_c$)), and Y=round($\alpha$(y-$y_c$)), where "round" is a function that returns the closest integer to its argument. At step 906, when more than one gray value is added to the same bin, a count is kept of the number of pixels placed in each super-resolution bin. At step 908, the final super-resolution dot image is obtained by dividing the binned gray values (steps 900–904) by the recorded bin count for each super-resolution bin (step 906).

Figure 9:
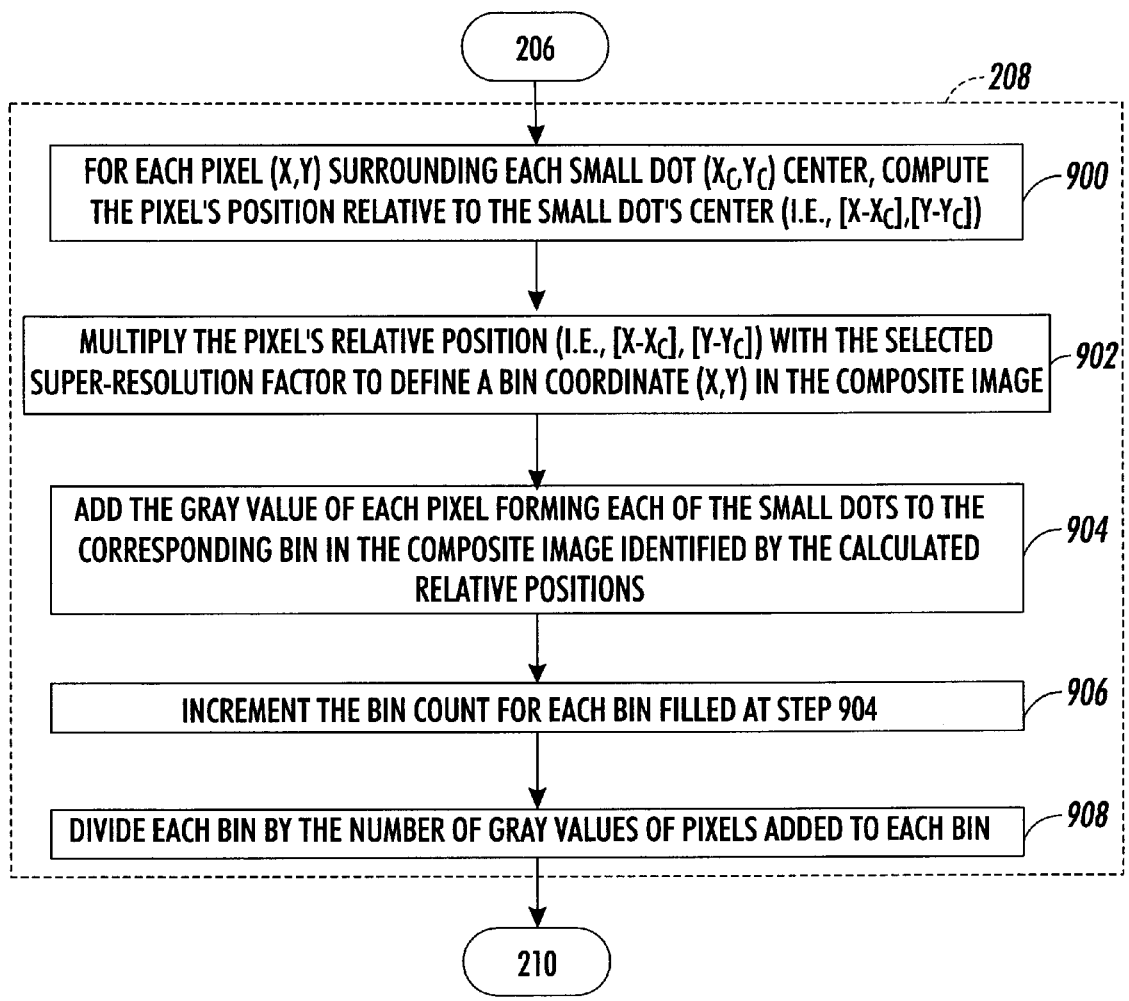
FIG. 9 is a flow diagram that sets forth the steps for constructing a composite image of a dot.
Figure 10A:
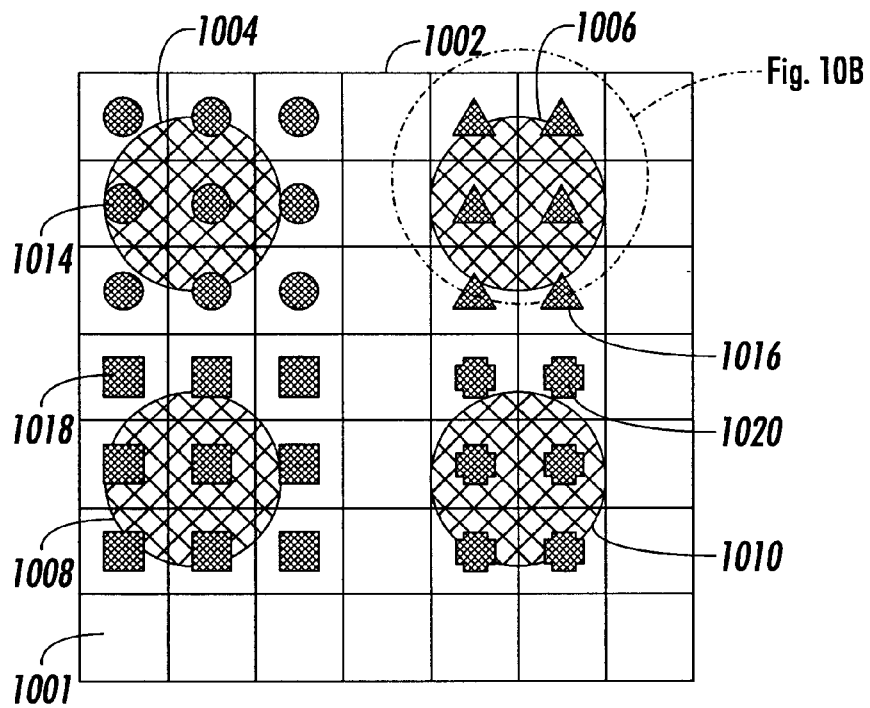
FIG. 10A illustrates four small dots in a section that is a blow up of the calibration image.
Figure 10B:
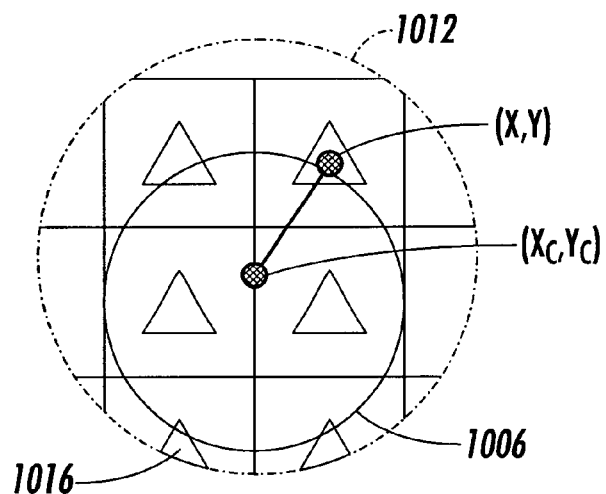
FIG. 10B illustrates a blow up of a portion of FIG. 10A.
Figure 11:
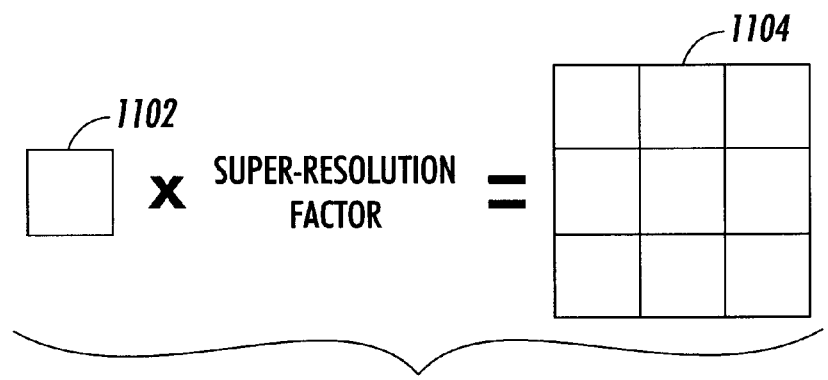
FIG. 11 illustrates the effect of super-resolving a pixel in the calibration image.

FIGS. 10–12 illustrate an example of the manner in which to perform the steps in flow diagram shown in FIG. 9. FIG. 10A illustrates a segment 1002 of a normalized small dot image (NSDI). The segment is a 7×7 matrix of pixels. An example of a single pixel in the matrix is indicated by reference number 1001. Each pixel in the array has a corresponding gray value. In the segment 1002, there are four small dots 1004, 1006, 1008, and 1010, with centers identified using circles 1014, triangles 1016, squares 1018, and crosses 1020, respectively. Also, FIG. 10B illustrates the small dot 1006 shown in FIG. 10A in greater detail in blow up 1012. The blow up 1012 illustrates a small dot center (i.e., (xc, yc)) and a pixel position (i.e., (x,y)).

Figure 12A:
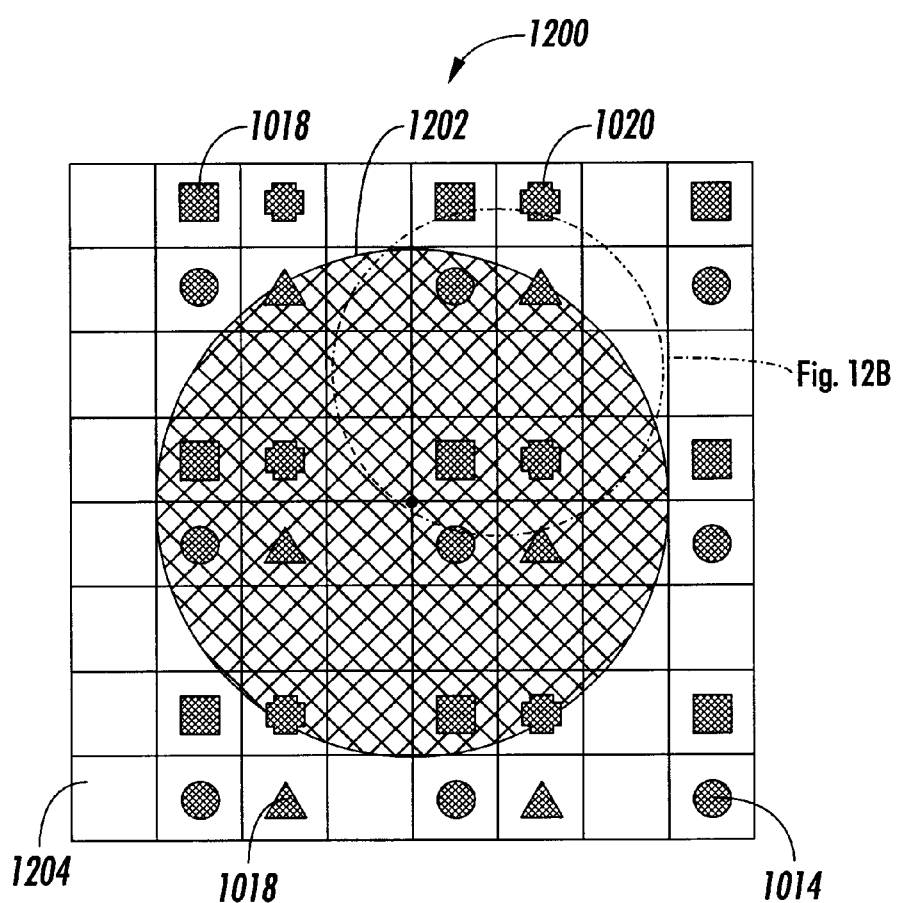
FIG. 12A illustrates a composite dot image of the positions of the pixels forming the dots illustrated in FIG. 10A at the super-resolution illustrated in FIG. 11.
Figure 12B:
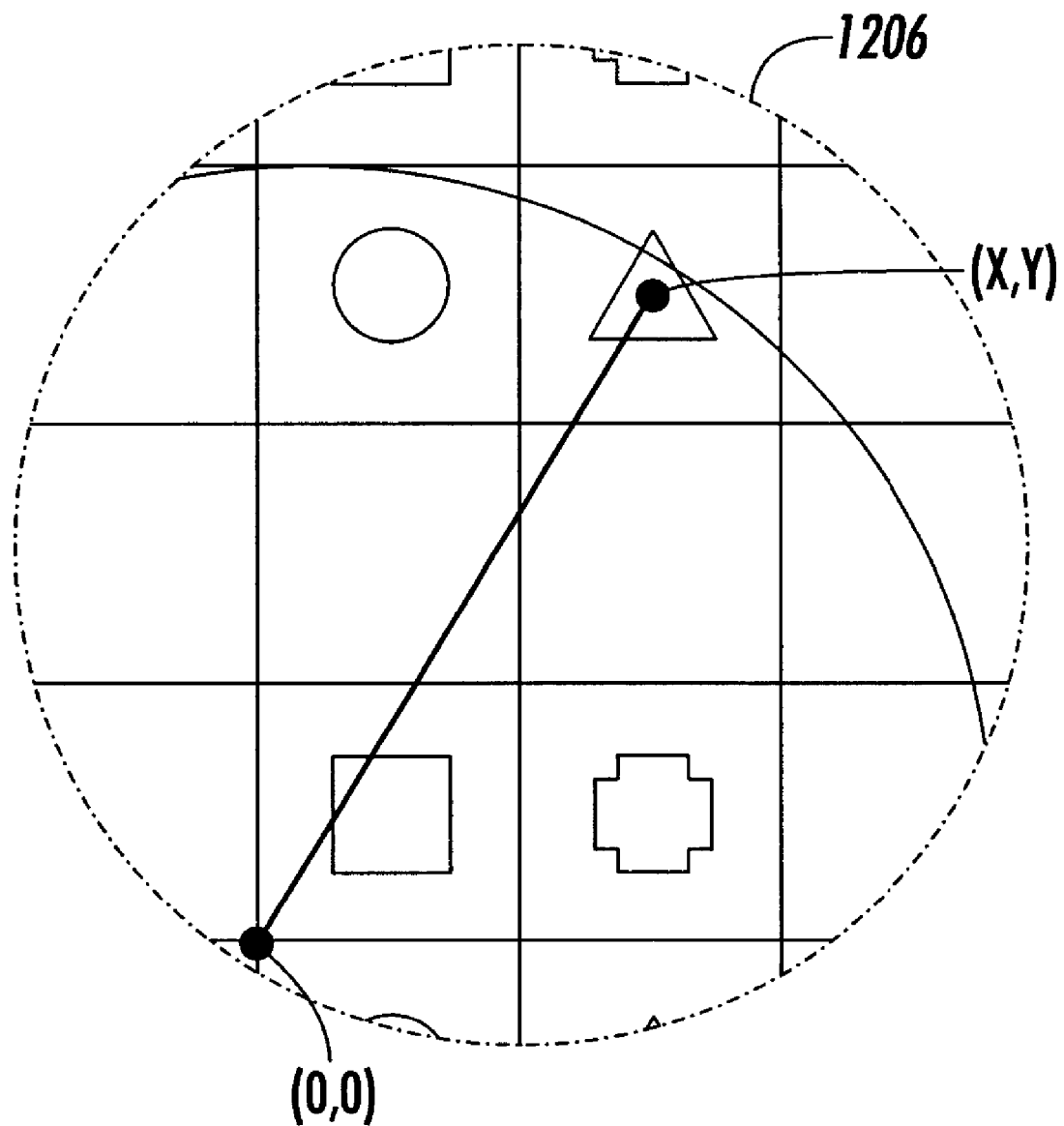
FIG. 12B illustrates a blow up of a portion of FIG. 12A.

FIG. 11 illustrates a pixel 1102 from the calibration image 108 super-resolved by a factor of three. The resulting super-resolution pixel 1104 is a cluster of nine super-resolution pixels. FIG. 12A illustrates an example of a composite dot image 1200 constructed as set forth at step 210 (shown in FIG. 2). The composite dot image 1200 is defined at the super-resolution illustrated in FIG. 11. An example super-resolution pixel is identified in FIG. 12 by reference number 1204. The gray values of the pixels illustrated in FIG. 10 are binned in the super-resolution bins identified by the corresponding circles 1014, triangles 1016, squares 1018, and crosses 1020. Also, FIG. 12B illustrates in blow up 1206 of a portion of FIG. 12A the bin coordinates (X,Y) of the pixel position (x,y) illustrated in FIG. 10B in blow up 1012 of a portion of FIG. 10A. The resulting image defines a composite dot 1202.

H. Restoration Module for Restoring Blurred Images Using the 2-D PSF

In accordance with another aspect of the invention, the 2-D point spread function is used to produce a restored image. This step of restoring a blurred image is set forth at step 214 in FIG. 2. Generally, restoring images using a PSF is well known in the art as disclosed in detail by Jain in "Fundamentals of Digital Image Processing," Prentice-Hall, Inc., 1989 (ISBN 0-13-336165-9), in Chapter 8, which is incorporated herein by reference. For example, to begin the process of sharpening original image 110, the Fourier transform of the "observed" original image 110 (i.e., G(u,v)) and the Fourier transform of the 2-D PSF 120 (i.e., H(u,v)) are computed. The division of G(u,v) by H(u,v) produces an approximation of the original non-blurred image (i.e., F(u, v)) in the frequency domain. The Fourier transform of the approximated non-blurred image F(u,v) is taken to transform it back to the spatial domain. This is only one example of sharpening an original image 110 once the 2-D PSF 120 of the digital camera 102 is estimated. Those skilled in the art will appreciate that other methods for sharpening an image using the estimated PSF of the imaging system exist. For example, some other methods that take into account the presence of image noise include schemes based on Tikhonov-Miller regularization (N. P. Galatsanos and A. K. Katsaggelos, Methods for Choosing the Regularization Parameter and Estimating the Noise Variance in Image Restoration and Their Relation, *IEEE Trans. Image Processing*, Vol. 1, No. 3, July 1992, pp. 322–336), Projections on Convex Sets (J. Biemond, R. L. Lagendijk, and R. M. Mersereau, Iterative Methods for Image Deblurring, *Proc. IEEE*, Vol. 78, No. 5, May 1990, pp. 856–883), Kalman filtering (A. M. Tekalp, H. Kaufman, and J. W. Woods, Edge-Adaptive Kalman Filtering for Image Restoration with Ringing Suppression, *IEEE Trans. Acoustics, Speech, Signal Proc.*, Vol. 37, No. 6, June 1989, pp. 892–899) and Markov Random Fields (S. Geman, and D. Geman, Stochastic Relaxation, Gibbs Distributions and the Bayesian Restoration of Images, *IEEE Trans. Pattern Analysis and Machine Intelligence*, Vol. 6, No. 6, Nov. 1984, pp. 271–741).

It will be appreciated by those skilled in the art that super-resolution of the PSF of a digital image acquisition system makes it possible to derive restoration filters for super-resolved images. For example, the following references disclose different methods for using a PSF in a digital image acquisition system that records super-resolved images: S. P. Kim and W-Y. Su, "Recursive High-Resolution Reconstruction of Blurred Multiframe Images," *IEEE Trans. Image Proc.* Vol 2, No. 4, Oct. 1993, pp. 534–539; R. R. Schultz, and R. L. Stevenson, "Extraction of High-Resolution Frames from Video Sequences," *IEEE. Trans. Image Proc.* Vol 5, No 6, Jun 1996, pp. 996–1011; and A. J. Patti, M. I. Sezan and A. M. Tekalp, "Super-resolution Video Reconstruction with Arbitrary Sampling Lattices and Non-zero Aperture Time," *IEEE Trans. Image Proc.* Vol 6 No 8, Aug 1997, pp. 1064–1076.

I. Summary

It will be appreciated that the present invention may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for measuring a point spread function (PSF) of a digital image acquisition system, comprising the steps of:

recording an image of a calibration chart with the digital image acquisition system; the calibration chart having a set of entities arranged in a grid-like pattern; the recorded image of the calibration chart being defined as a calibration image;

identifying locations of the set of entities in the calibration image; and deriving a composite image of the entities using the identified locations of the set of entities in the calibration image for measuring the PSF of the digital image acquisition system in two-dimensions.

2. The method according to claim 1, further comprising the step of defining the entities arranged in the grid-like pattern on the calibration chart to be dots.

3. The method according to claim 1, further comprising the steps of:
recording an original image of a scene with the digital image acquisition system; and
deconvolving the original image to remove blur with the measured two-dimensional PSF.

4. The method according to claim 1, wherein said recording step comprises the step of recording the image of the calibration chart with a digital camera.

5. The method according to claim 1, further comprising the step of defining the calibration chart with entities having three different sizes.

6. The method according to claim 1, wherein said deriving step further comprises the step of computing an inverse image by reversing pixel values of the composite image of the entities; the inverse image defining the measured two-dimensional PSF.

7. The method according to claim 1, wherein said recording step records with the digital image acquisition system the calibration image with pixels having a first resolution.

8. The method according to claim 7, wherein said deriving step comprises the step of deriving the composite image of the entities having a second resolution greater than the first resolution; the second resolution being defined as a super-resolution.

9. The method according to claim 8, further comprising the step of interpolating positions of pixel values of the composite image of the entities using the positions of pixel values at the identified locations of the set of entities in the calibration image.

10. A method for generating a two-dimensional point spread function of a digital imaging system, comprising the steps of:
defining a calibration chart having a first set of dots;
recording an image of the calibration chart with the digital imaging system; the recorded image having pixels at a first resolution;
identifying positions in the recorded image for locating the dots in the first set of dots;
generating an image of a composite dot; and
computing an inverse image of the composite dot image by reversing the values of pixels of the composite dot image; the inverse image defining a two-dimensional point spread function.

11. The method according to claim 10, wherein said generating step generates the composite dot image with pixel values having a second resolution; said generating step interpolating positions of dots forming the composite dot image using the positions of dots identified by said identifying step.

12. The method according to claim 11, further comprising the step of normalizing pixels defining the recorded image to remove effects of lighting variations.

13. The method according to claim 10, further comprising the step of deconvolving an original image to remove blur with the point spread function to produce a corrected image.

14. The method according to claim 10, wherein said computing step further comprises the steps of:

computing a center position of a pixel in the window of pixels relative to the location of a selected dot in the first set of dots;
selecting a super-resolution factor at which to super-resolve each pixel in the composite dot image;
recording in a super-resolution pixel of the composite dot image a gray-level value of the selected dot.

15. The method according to claim 10, further comprising the step of defining the dots in the first set of dots to fill an area that is smaller than a pixel at the first resolution.

16. The method according to claim 10, further comprising the step of specifying the calibration chart to have a second set of dots; dots in the second set of dots having a size that is greater than the first set of dots.

17. The method according to claim 10, further comprising the step defining dots in the first set of dots to be square dots.

18. A method for measuring a point spread function (PSF) in two-dimensions, comprising the steps of:
recording an image of a calibration chart; the calibration chart having a set of dots arranged thereon in a grid-like pattern; and
deriving a two-dimensional PSF by inverting values of a composite dot image generated by performing the steps of:
locating the positions of the dots in the set of dots in the recorded image of the calibration chart;
computing a position for each pixels forming each dot in the set of dots relative to the positions of the entities located at said locating step; and
generating the composite dot image by assigning gray values of each pixel forming each dot in the set of dots at the computed relative positions.

19. The method according to claim 18, further comprising the step of scaling the relative positions computed by said computing step with a super-resolution factor that has a value greater than one.

20. The method according to claim 18, further comprising the steps of:
defining the set of dots to have a first subset of dots, a second subset of dots, and a third subset of dots; said defining step defining the first subset of dots as a small set of dots, the second subset of dots as a registration set of dots, and the third subset of dots as a corner set of dots; dots in the third subset of dots being larger than dots in the first and second subsets of dots; dots in the first subset of dots being smaller than dots in the second and third subsets of dots;
locating the corner dots in the recorded image by segmenting the recorded image into image segments that isolate each corner dot;
computing a transformation between the calibration chart and the recorded image using the locations of the corner dots identified in each image segment;
predicting a position of the corner dots in the recorded image using the computed transformation;
computing image distortion between the predicted position of the corner dots in the recorded image and positions of the corner dots in the calibration chart; and
computing positions of the small dots in the recorded image using the transformation and the computed image distortion.

* * * * *